(12) United States Patent
Du et al.

(10) Patent No.: US 9,070,023 B2
(45) Date of Patent: Jun. 30, 2015

(54) SYSTEM AND METHOD OF ALERTING A DRIVER THAT VISUAL PERCEPTION OF PEDESTRIAN MAY BE DIFFICULT

(71) Applicants: Toyota Motor Engineering & Manufacturing North America, Inc., Erlanger, KY (US); Toyota Jidosha Kabushiki Kaisha, Toyota Aichi (JP); Indiana University Research and Technology Corporation, Indianapolis, IN (US)

(72) Inventors: Eliza Y. Du, Indianapolis, IN (US); Kai Yang, Indianapolis, IN (US); Pingge Jiang, Indianapolis, IN (US); Rini Sherony, Ann Arbor, IN (US); Hiroyuki Takahashi, Toyota (JP)

(73) Assignees: Toyota Motor Engineering & Manufacturing North America, Inc., Erlanger, KY (US); Toyota Jidosha Kabushiki Kaisha, Toyota (JP); Indiana University Research and Technology Corporation, Indianapolis, IN (US)

( * ) Notice: Subject to any disclaimer, the term of this patent is extended or adjusted under 35 U.S.C. 154(b) by 42 days.

(21) Appl. No.: 14/034,103

(22) Filed: Sep. 23, 2013

(65) Prior Publication Data
US 2015/0086077 A1    Mar. 26, 2015

(51) Int. Cl.
   *G06K 9/00*     (2006.01)
   *G08G 1/16*    (2006.01)

(52) U.S. Cl.
   CPC ............ *G06K 9/00805* (2013.01); *G08G 1/166* (2013.01); *G06K 9/00362* (2013.01); *G06T 2207/30236* (2013.01)

(58) Field of Classification Search
   CPC .......... G06K 9/00362; G06K 9/00369; G06K 9/00624; G06K 9/00664; G06K 9/00671; G06K 9/00771; G06K 9/00791; G06K 9/00805; G06K 9/3241; G06K 2017/0045; G06K 2209/21; G06T 7/20; G06T 2207/30236; G06T 2207/30252; G06T 2207/30261; G08G 1/166
   See application file for complete search history.

(56) References Cited

U.S. PATENT DOCUMENTS

| | | |
|---|---|---|
| 4,181,917 A | 1/1980 | Richman |
| 5,053,864 A | 10/1991 | Thompson |

(Continued)

OTHER PUBLICATIONS

"An Efficient Method for Contour Tracking Using Active Shape Models" by Baumberg et al., 1994.

(Continued)

*Primary Examiner* — Manav Seth
(74) *Attorney, Agent, or Firm* — Gifford, Krass, Sprinkle, Anderson & Citkowski, P.C.

(57) ABSTRACT

A pedestrian perception alert system configured to issue a warning during real-time when a driver's visual detection of a pedestrian is difficult, and a method thereof is provided. The system includes a video camera, an alert for issuing a warning, a processor, and a Pedestrian Detection Unit ("PDU"). The PDU analyzes the video camera image to detect a pedestrian. A Global Clutter Analysis Unit ("GCAU") generates a global clutter score. A Local Pedestrian Clutter Analysis Unit ("LPCAU") generates a local pedestrian clutter score. The processer processes the global clutter score and local pedestrian clutter score so as to generate a pedestrian detection score. The alert is actuated when the pedestrian detection score is outside of a predetermined threshold so as to notify the driver that perception of a pedestrian is difficult at that time.

55 Claims, 7 Drawing Sheets

(56) References Cited

U.S. PATENT DOCUMENTS

| | | | |
|---|---|---|---|
| 5,602,760 A | 2/1997 | Chacon et al. | |
| 6,081,753 A | 6/2000 | Meitzler et al. | |
| 7,218,756 B2 * | 5/2007 | Garoutte | 382/103 |
| 7,409,092 B2 * | 8/2008 | Srinivasa | 382/199 |
| 7,440,589 B2 * | 10/2008 | Garoutte | 382/103 |
| 7,454,058 B2 * | 11/2008 | Porikli | 382/168 |
| 7,460,951 B2 * | 12/2008 | Altan et al. | 701/536 |
| 7,486,803 B2 * | 2/2009 | Camus | 382/104 |
| 7,657,059 B2 | 2/2010 | Olson et al. | |
| 7,660,438 B2 * | 2/2010 | Camus | 382/104 |
| 7,796,056 B2 * | 9/2010 | Fein et al. | 340/995.24 |
| 7,848,565 B2 | 12/2010 | Goerick et al. | |
| 7,853,076 B2 | 12/2010 | Le Meur et al. | |
| 7,881,554 B2 | 2/2011 | Castorina et al. | |
| 7,885,453 B1 | 2/2011 | Wallack et al. | |
| 8,294,794 B2 * | 10/2012 | Zhang et al. | 348/251 |
| 8,345,100 B2 * | 1/2013 | Zhang et al. | 348/148 |
| 8,350,724 B2 * | 1/2013 | Szczerba et al. | 340/932.2 |
| 8,384,532 B2 * | 2/2013 | Szczerba et al. | 340/435 |
| 8,396,282 B1 | 3/2013 | Huber et al. | |
| 8,411,145 B2 * | 4/2013 | Fardi | 348/148 |
| 8,437,549 B2 | 5/2013 | Iwasaki et al. | |
| 8,447,139 B2 | 5/2013 | Guan et al. | |
| 8,611,590 B2 * | 12/2013 | Pakulski et al. | 382/103 |
| 8,704,653 B2 * | 4/2014 | Seder et al. | 340/461 |
| 8,731,291 B2 * | 5/2014 | Hao et al. | 382/168 |
| 8,861,787 B2 * | 10/2014 | Kido | 382/103 |
| 8,897,560 B2 * | 11/2014 | Hao et al. | 382/168 |
| 2007/0047809 A1 * | 3/2007 | Sasaki | 382/170 |
| 2010/0253541 A1 * | 10/2010 | Seder et al. | 340/905 |

OTHER PUBLICATIONS

"Measuring Visual Clutter" by Rosenholtz et al., Feb. 2005.
"Regional Effects of Clutter on Human Target Detection Performance" by Asher et al., Apr. 2013.
"Measuring Search Efficiency in Complex Visual Search Tasks: Global and Local Clutter" by Beck et al., 2010.
"Snakes: Active Contour Models" by Kass et al., 1988.
"An Efficient k-Means Clustering Algorithm: Analysis and Implementation" by Kanungo, 2002.
"Person Following Using Histograms of Oriented Gradients" by J. Brookshire, Jun. 1, 2010.
"An Efficient Method for Contour Tracking Using Active Shape Models" by Baumberg et al., 1984.
"A New Approach of Visual Clutter Analysis for Pedestrian Detection" by Kai Yang et al., Oct. 2013.
"Feature Congestion: A Measure of Display Clutter" by Ruth Rosenholtz et al., 2005.

* cited by examiner

|  | Image 1 | Image 2 | Image 3 | Image 4 | Image 5 | Image 6 |
|---|---|---|---|---|---|---|
| Global Environmental Clutter Score | 0.116 | 0.220 | 0.221 | 0.307 | 0.307 | 0.291 |
| Local Pedestrian Clutter Score | 0.928 | 0.841 | 0.777 | 0.842 | 0.507 | 0.527 |

SYSTEM AND METHOD OF ALERTING A DRIVER THAT VISUAL PERCEPTION OF PEDESTRIAN MAY BE DIFFICULT

FIELD OF THE INVENTION

The invention relates to a system and method for alerting a driver that the visual perception of a pedestrian may be difficult. More particular, the system and method generate a global clutter score and a local pedestrian clutter score, processes both the global clutter score and local pedestrian clutter score so as to calculate a pedestrian detection score, wherein the driver is alerted when the pedestrian detection score is outside of a predetermined threshold.

BACKGROUND OF THE INVENTION

Pedestrian perception alert systems utilizing three dimensional features are known in the art. However, three dimensional detection systems require the use of range sensors such as radar, sonar, laser or the like. Further, three dimensional detection systems require robust computing platforms capable of fusing the three dimensional data with a two dimensional video camera image.

Pedestrian detection utilizing two dimensional video image analyses is also known. However, current analysis of two dimensional pedestrian detection systems are configured to process the two dimensional image so as to ascertain the presence of a pedestrian. Upon detecting a pedestrian, the two dimensional pedestrian detection systems will identify the location of the detected pedestrian and/or alert the driver. However, without additional three dimensional features, current systems may provide a lot of false positives. Further, current two dimensional pedestrian detection systems do not address the difficulty that a driver may have in visually perceiving a pedestrian. Thus, by alerting the driver that visual perception is difficult, the driver may be able to ascertain with better certainty, whether a pedestrian detection alert is a false positive.

Further, current two dimensional pedestrian detection systems do not take into account pedestrian behavior as a factor for generating a clutter value. Though it is known to project the movement of a pedestrian in subsequent video image so as to facilitate the detection of a pedestrian in two dimensional space, current systems do not consider how the movement or location of a pedestrian affects a driver's ability to see the pedestrian.

Accordingly, it remains desirable to have a system and method for alerting the driver in instances where visual detection of a pedestrian is difficult. Further, it remains desirable to have a system and method utilizing two-dimensional video imagery for alerting the driver in instances where visual detection of a pedestrian is difficult. Further, it remains desirable to have a system and method wherein pedestrian behavior is calculated into determining the difficulty of perceiving a pedestrian.

SUMMARY OF THE INVENTION

A pedestrian perception alert system and a method for issuing an alert to a driver are provided. The system and method are configured to issue an alert in real-time where a driver's visual detection of a pedestrian is difficult. The pedestrian perception alert system includes a video camera, a processor, and an alert. The video camera is configured to capture two dimensional video images. The alert is configured to issue a warning that it is difficult to visually perceive a pedestrian within the driving environment. The processor is in electrical communication with the camera.

The pedestrian perception alert system further includes a Pedestrian Detection Unit ("PDU"), Global Clutter Analysis Unit ("GCAU"), and Local Pedestrian Clutter Analysis Unit ("LPCAU"). The PDU is configured to analyze the video image to detect a pedestrian. The GCAU is configured to generate a global clutter score of the video image. The global clutter score measures the clutter of the entire video image. The LPCAU is configured to generate a local pedestrian clutter score. The local pedestrian clutter score measures the clutter of each of the pedestrians detected in the video image.

In operation, the PDU detects a pedestrian in the video image, and the processor subsequently initiates both the GCAU and the LPCAU. The processor process the global clutter score and local pedestrian clutter score so as to generate a pedestrian detection score. The processor is further configured to actuate the alert when the pedestrian detection score is outside of a predetermined threshold.

The pedestrian perception alert system may further include a Saliency Map Generating Unit ("SMGU"). The SMGU is configured to process the video image and extract salient features from the video image. The processor is further configured to actuate the LPCAU so as to process the extracted salient features when generating the local pedestrian clutter score. The local pedestrian clutter score is processed with the global clutter score so as to calculate a pedestrian detection score. The salient features may include pedestrian behavior, such as pedestrian motion. The pedestrian behavior may be further predicated upon the environment surrounding the pedestrian.

The pedestrian perception alert system may further include a Pedestrian Group Analysis Unit ("PGAU") configured to detect a group of pedestrians and assign a perception difficulty value to the group of pedestrians. The PGAU analyzes individual pedestrian interaction within the group of pedestrians, and the interaction of one group of pedestrians with respect to another group of pedestrians so as to determine the impact the group of pedestrians may have on the driver's ability to visually perceive the group or an individual pedestrian within the group.

A method for issuing an alert in real-time when a driver's visual detection of a pedestrian is difficult is also provided. The method includes the steps of providing a video camera, an alert, and a processor. The video camera is configured to capture video image. The alert is configured to issue a warning that a pedestrian within the driving environment is difficult to visually perceive. The processor is in electrical communication with the camera.

The method further includes the steps of providing a Pedestrian Detection Unit ("PDU"), a Global Clutter Analysis Unit ("GCAU"), and a Local Pedestrian Clutter Analysis Unit ("LPCAU"). The PDU is configured to analyze the video camera image to detect a pedestrian. The GCAU is configured to generate a global clutter score. The global clutter score is a measurement of the clutter of the entire video image. The LPCAU is configured to generate a local pedestrian clutter score. The local pedestrian clutter score is a measurement of the clutter of each of the pedestrians detected in the video image. The processor process the global clutter score and local pedestrian clutter score so as to generate a pedestrian detection score. The processor is further configured to actuate the alert when the pedestrian detection score is outside of a predetermined threshold.

The method further includes the step of providing a Saliency Map Generating Unit ("SMGU"). The SMGU is configured to process the video image and extract salient features from the video image. The processor is further configured to process the extracted salient features with LPCAU so as to generate the local pedestrian clutter score. The local pedestrian clutter score is processed with the global clutter score so as to calculate a pedestrian detection score. The salient features may include pedestrian behavior, such as pedestrian motion. The pedestrian behavior may be further predicated upon the environment surrounding the pedestrian.

The method may further include the step of providing a Pedestrian Group Analysis Unit ("PGAU") configured to detect a group of pedestrians and assign a perception difficulty value to the group of pedestrians. The PGAU analyzes individual pedestrian interaction within the group of pedestrians, and the interaction of one group of pedestrians with respect to another group of pedestrians so as to determine the impact the group of pedestrians may have on the driver's ability to visually perceive the group or an individual pedestrian within the group.

DETAILED DESCRIPTION OF THE PREFERRED EMBODIMENTS

Figure 1:
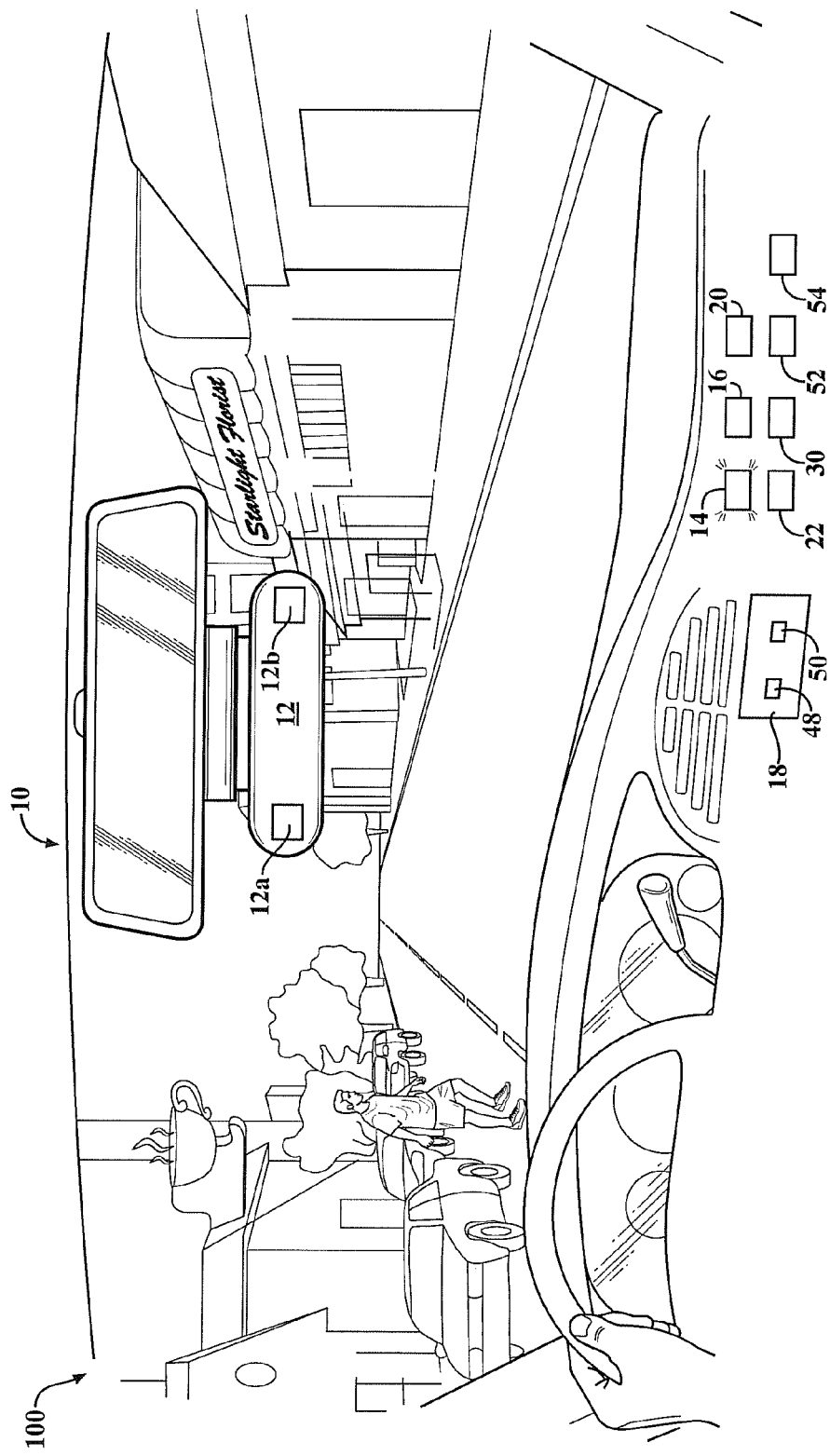
FIG. 1 is a perspective view showing the system employed in a natural driving environment.

With reference first to FIG. 1, a pedestrian perception alert system 10 according to an embodiment of the invention is provided. The pedestrian perception alert system 10 is configured to issue an alert in instances during real-time environment where a driver's visual detection of a pedestrian is difficult. Thus, by alerting a driver that a pedestrian is difficult to visually perceive, the driver may adjust his/her driving behavior. Further, the pedestrian perception alert system 10 may be further incorporated with an autonomous control system wherein vehicle movement is further restricted, or in the alternative, the autonomous control system may be configured to take control of the vehicle in instances where it is difficult for a driver to visually perceive a pedestrian. The pedestrian perception alert system 10 may be further advantageous in that the driver may be able to ascertain whether a pedestrian detection is a false positive.

The pedestrian perception alert system 10 may be integrated into an automotive vehicle 100. The pedestrian perception alert system 10 includes a video camera 12 configured to capture video images. The pedestrian perception alert system 10 further includes an alert 14, and a processor 16. The alert 14 is configured to issue a warning that the pedestrian is within the driving environment, and is visually difficult to perceive. The alert 14 may be disposed within the cabin space of the vehicle, and may be a visual notification such as a light, or an audible signal such as a chime, or a series of chimes. The processor 16 is in electrical communication with the video camera 12 and is configured to process the video image utilizing analysis units, as described below, so as to issue a warning to the driver.

Though FIG. 1 shows the video camera 12 mounted to the underside of a rearview mirror, it should be appreciated that the video camera 12 may be mounted elsewhere. Further, multiple video cameras 12 may be used to provide 360 degree coverage of the natural driving environment. In such an embodiment, it should be appreciated that the processor 16 may be further configured to fuse the video image caught by each video camera 12 so as to build a 360 degree view of the natural driving environment. In one embodiment, the video camera 12 is a high resolution camera configured to capture a 122 degree camera view, record 32 frames per second at 1280×720 resolution, commonly referenced as the DOD GS600 Digital Video Recorder ("DVR"). The video camera 12 may include other features such as GPS antenna 12a for obtaining geographic location, and a gravity sensor 12b for sensing motion.

Figure 2:
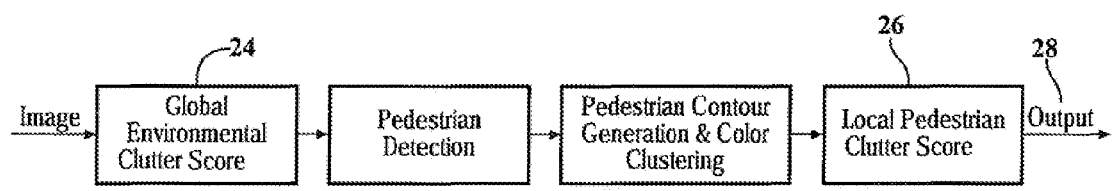
FIG. 2 is diagram of the system.

With reference also to FIG. 2, an overall diagram showing the operation of the pedestrian perception alert system 10 is provided. The system 10 captures video image, measures the global clutter of the image, processes the image to detect a pedestrian, utilizes pedestrian contour and color clustering to verify that the detected pedestrian is indeed a pedestrian, and then measures the clutter of the pedestrian. Features such as the pedestrian contour, and color of the cloth may also be used to measure the clutter. The output is a measurement of the difficulty a driver may have of visually perceiving the detected pedestrian within the driving environment. A more detailed description is provided below.

The pedestrian perception alert system 10 further includes a Pedestrian Detection Unit ("PDU") 18, a Global Clutter Analysis Unit ("GCAU") 20, and a Local Pedestrian Clutter Analysis Unit ("LPCAU") 22. The PDU 18, GCAU 20, and LPCAU 22 may be manufactured as firmware with protocol configured to be processed and actuated by the processor 16. The firmware may be a separate unit disposed with other electronics of the vehicle.

The PDU 18 is configured to analyze the video camera 12 image to detect a pedestrian. The PDU 18 may use input such as the geographic location of the vehicle gathered by the GPS antenna 12a, or motion input gathered by the gravity sensor 12b to perform pedestrian detection. The processor 16 actuates the PDU 18 wherein the PDU 18 analyzes predetermined frames to determine if a pedestrian is present in the natural driving environment. For instance, the PDU 18 may be configured to identify regions of interests within each frame, wherein the background of the frame is eliminated so as to focus processing and analysis on the regions of interest. The PDU 18 may then apply pedestrian feature matching, to include size, motion and speed, height-width ratio and orientation.

The PDU 18 notifies the processor 16 in the event a pedestrian is present within the natural driving environment. The processor 16 then actuates both the GCAU 20 and the LPCAU 22 upon notification from the PDU 18. The GCAU 20 is configured to generate a global clutter score 24. The global clutter score 24 is a measurement of the clutter of the entire video image. The LPCAU 22 is configured to generate a local pedestrian clutter score 26. The local pedestrian clutter score 26 is a measurement of the clutter of each pedestrian detected in the video image. The processer 16 is further configured to process both the global clutter score 24 and local pedestrian clutter score 26 so as to generate a pedestrian detection score 28. The pedestrian detection score 28 is the difference between the global clutter score 24 and local pedestrian clutter score 26. The pedestrian detection score 28 measures the difficulty of visually seeing a pedestrian based upon both the amount of clutter in the driving environment and the clutter of the detected pedestrian with respect to the clutter in the environment. For use herein, the term clutter refers to a combination of foreground and background in a view that provides distracting details for some individuals who are unable to detect object(s) from its background. The processor 16 is further configured to actuate the alert 14 when the pedestrian detection score 28 is outside of a predetermined threshold.

The GCAU 20 measures the overall clutter score of the entire video image based upon the edge density, luminance variation and chrominance variation of the video image to calculate the global clutter score 24. The global clutter score 24 may be expressed as follows:

$$GEC = \alpha \rho_E + \beta \sigma_L + (1 - \alpha - \beta)\sigma_c,$$

where $\rho_E$ is the edge density, $\sigma_L$ is the luminance variation and $\sigma_c$ is the chrominance variation. $\alpha > 0$ and $\beta > 0$ are feature weights.

The edge density may be calculated by applying a detector, such as a Canny detector, with fixed threshold range to detect an edge and to compare the edge density of various frames of the video image having different driving scenarios, illumination and weather conditions. For example, the lower threshold may be set to 0.11 and the upper threshold may be set to 0.27. To replicate the low pass characteristic of human vision, a 7×7 Gaussian filter is applied to each video frame processed by the Canny detector so as to remove excess high frequency image components to which human vision is not sensitive. It should be appreciated that the dimensions provided herein are used for processing the dimensions and resolution of the video image captured by the DOD GS600 Digital Video Recorder, and that the dimensions may change to correspond to dimensions of resolution of the video image captured by the camera. The edge density is calculated as the ratio between the number of edge pixels and the total number of pixels within the frame of the video image.

Figure 3:
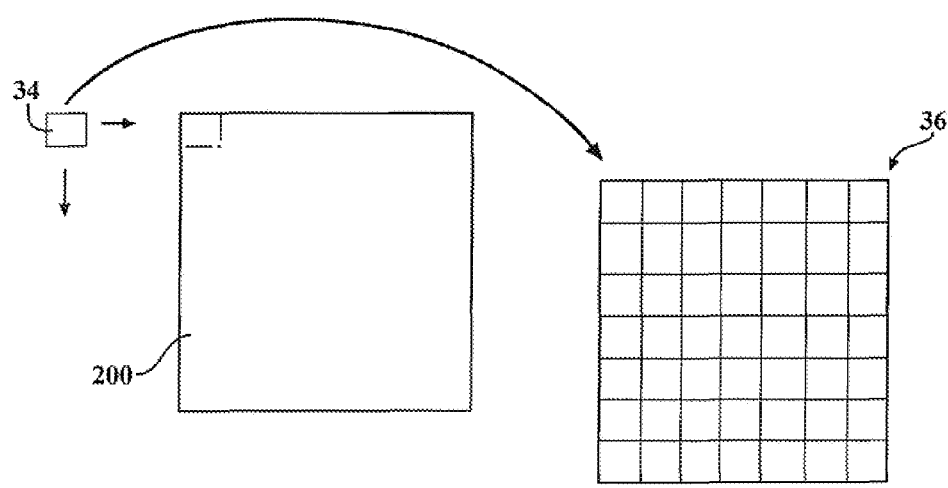
FIG. 3 is a perspective view showing the operation of an embodiment of the GCAU populating a luminance variation matrix.

Luminance variation is measured globally. Luminance variation measures the luminance change of the entire video image 200. For example, the GCAU 20 may include a sliding window 34 and a luminance variation matrix 36, as shown in FIG. 3. The luminance variation matrix 36 is dimensioned the same size as the video frame. When using a DOD GS600 Digital Video Recorder, a 9×9 sliding window 34 is slid across the frame of the video image so as to calculate a standard deviation of luminance value within the sliding window 34 with respect to the same space of the luminance variation matrix 36. The standard deviation for a particular area of the video frame is entered into the corresponding position of the luminance variation matrix 36. The global luminance variation is calculated as the mean value of the populated luminance variation matrix 36.

The chrominance variation is calculated using two chrominance channels, "a" and "b". The chrominance variation is calculated by determining the standard deviation for each respective channel. The global chrominance variation may be calculated as follows:

$$\sigma_c = \sqrt{\sigma_a^2 + \sigma_b^2},$$

where $\sigma_c$ is the global chrominance variation, $\sigma_a$ is the chrominance variation of channel "a," and $\sigma_b$ is the chrominance variation of channel "b."

The global clutter score 24 may be outputted as a weighted sum of the edge density, luminance variation, and chrominance variation. The edge density, luminance variation, and chrominance variation may be evenly weighted, with each selected at ⅓ weighted value. The resultant global environmental clutter score may be scaled and normalized to a value between 0 and 1 such that the higher score means higher clutter.

Figure 4:
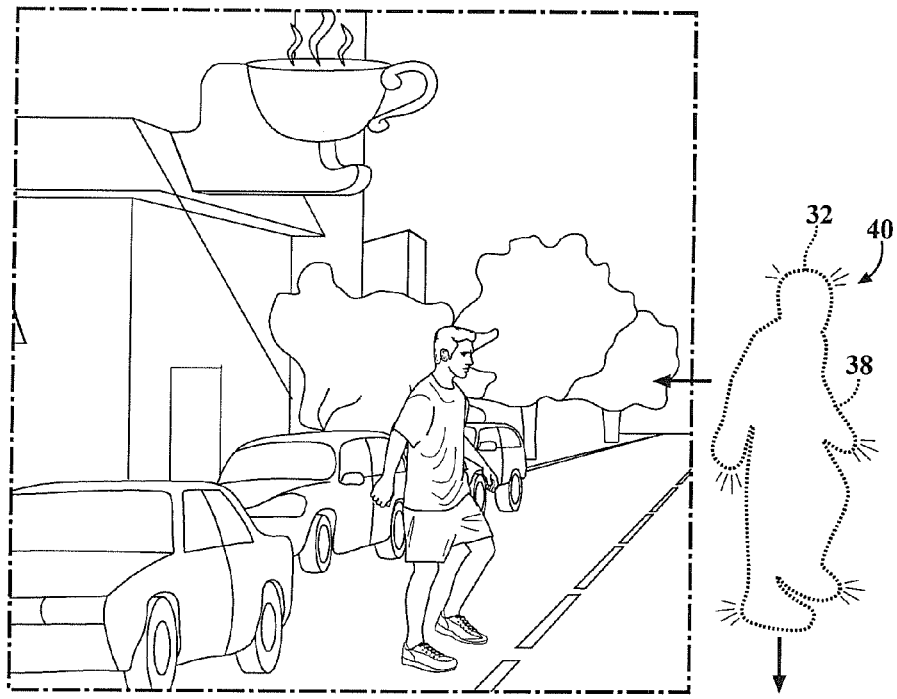
FIG. 4 is an illustration showing the operation of an embodiment of the PCGU utilizing a pedestrian mask.

With reference now to FIG. 4, an illustrative diagram showing the operation of a Pedestrian Contour Generation Unit ("PCGU") 30 is provided. As discussed above, the LPCAU 22 processes edge density of the detected pedestrian, edge distribution, local luminance variation, local chrominance variation, mean luminance intensity, and mean chrominance intensity to calculate the local pedestrian clutter score 26. The PCGU 30 is configured to generate a pedestrian mask 32, which may be used to obtain edge density, edge distribution, local luminance variation, local chrominance variation, mean luminance intensity and mean chrominance intensity of the detected pedestrian. The pedestrian mask 32, shown as a dashed silhouette of a pedestrian, is a constructed image of the pedestrian based upon features commonly associated with a pedestrian. The pedestrian mask 32 may include the contours of the pedestrian which are applied to the detected pedestrian so as to verify that the detected pedestrian is indeed an actual pedestrian. It should be appreciated that these features may vary based upon the location of the pedestrian within the driving environment, and/or the time at which the PCGU 30 is actuated, may be used to generate the pedestrian mask 32, and to refine the pedestrian mask 32 through subsequent video frames so as to ensure accuracy of the verification process. Thus, by continuously refining the pedestrian mask 32 through iteration, the pedestrian mask 32 is deformable model 40, as indicated by the quotation marks surrounding the pedestrian mask 32 shown in FIG. 4. The deformable mask is applied around the pedestrian contour 38. Energy minimization may be used to evolve the contour 38. The energy function may be expressed as follows:

$$E(C) = \alpha \int_0^1 |C'(s)|^2 ds + \beta \int_0^1 |C''(s)|^2 ds - \gamma \int_0^1 |\nabla u_0(C(s))|^2 ds,$$

Where the first two integrals stand for the internal energy which control the contour 38 smoothness and the third integral is the external energy which evolves the contour 38 to the object. C'(s) is the tangent of the curve and C"(s) is normal to the curve. The edge detector function may be defined as:

$$g(\nabla u_0(x, y)) = \frac{1}{1 + |\nabla G_\sigma(x, y) * u_0(x, y)|^p},$$

where $G_\sigma$ is a Gaussian smooth filter and $\nabla u_0$ is the image gradient. The generated contour 38 defines the pedestrian mask 32 which may be used by the LPCAU 22 to compute pedestrian clutter features, to include local pedestrian luminance variation and local pedestrian chrominance variation.

Figure 5:
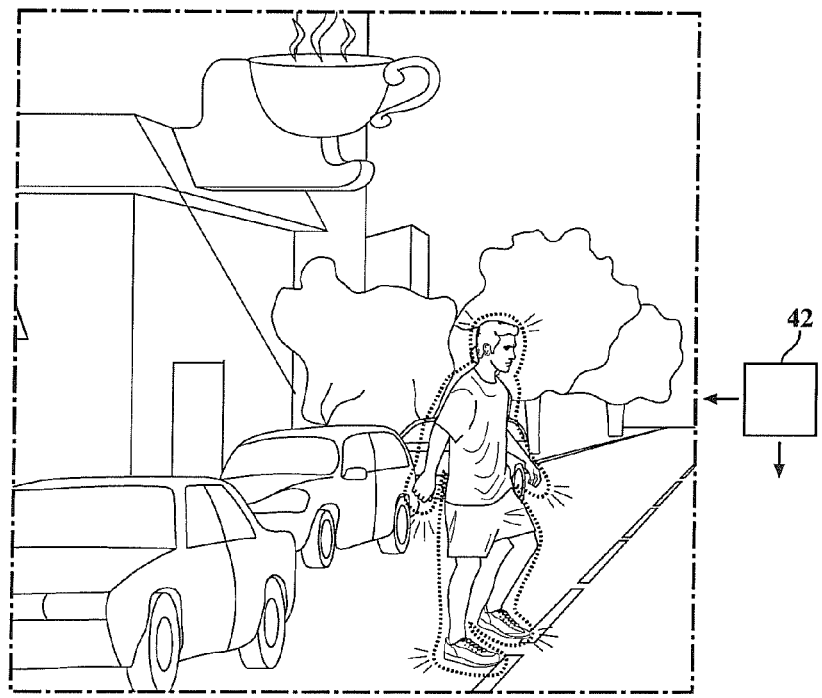
FIG. 5 is an illustration of the operation of an embodiment of the PCGU applying a cloth mask.

With reference now to FIG. 5, an illustrative diagram showing the operation of an embodiment of the PCGU 30 is provided. The PCGU 30 may be further configured to generate a cloth mask 42. The cloth mask 42 may be used to replicate a human visual attention model by providing a cloth region that is homogenous in both color and luminance intensity, wherein the cloth region may be compared with the background so as to simulate the human visual attention model. The cloth mask 42 is generated by K-mean color clustering based cloth region segmentation which is subsequently applied to the detected pedestrian to segment the cloth region. For instance, K color subsets are generated to minimize the within-cluster distance:

$$\arg\min_s \Sigma_{n=1}^{k} \Sigma_{I(x,y) \in S_n} \|I(x,y) - \mu_n\|^2$$

Where $S = \{S_1, \ldots S_k\}$ is the k clusters, $1(x,y)$ is the chrominance pixel value and $\mu_n$ is the mean value of each cluster. The cloth mask 42 is then formed as an intersection of the pedestrian mask 32 by active contour 38 and cloth region derived from K-mean color clustering algorithm. The LPCAU 22 is further configured to process the pedestrian mask 32 and the cloth mask 42 so as to compute the local pedestrian clutter score 26. Accordingly, the local pedestrian clutter score 26 may include features of shapes associated with the pedestrian which may be affected by movement of the pedestrian, the location of the pedestrian, and the color of the pedestrian's clothes.

Figures 6, 7:
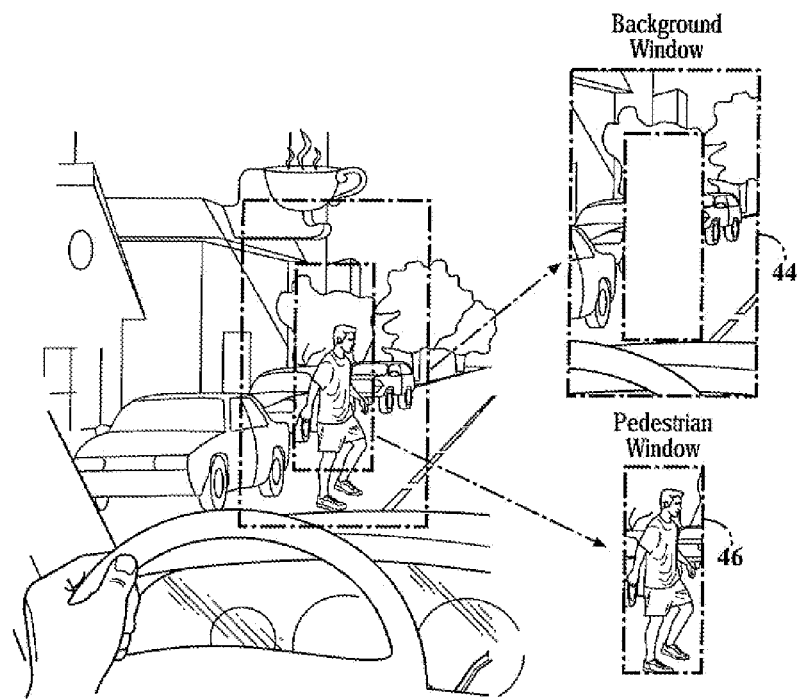
FIG. 6 is an illustration of the operation of an embodiment of the LPCAU generating a background window and a detected pedestrian window.
FIG. 7 is chart showing the global pedestrian clutter score and local pedestrian clutter score for a corresponding driving scene.

With reference now to FIG. 6, the LPCAU 22 may be further configured to generate a background window 44 and a detected pedestrian window 46. The background window 44 is a portion of the video image having a predetermined dimension of the environment surrounding the detected pedestrian. The detected pedestrian window 46 is a portion of the video frame dimensioned to capture the image of the detected pedestrian. For example, the background window 44 may be at least twice the area of the detected pedestrian window 46. The LPCAU 22 is further configured to determine the ratio between the number of edge pixels and the total number of pixels within both (1) the detected pedestrian window 46 and (2) the background window 44, and absent the detected pedestrian window 46, so as to calculate an edge density for a pedestrian.

The edge density may be calculated in a similar manner as the edge density for the global environment. For instance, the edge density of the background window 44 and the detected pedestrian window 46 may be calculated by applying a detector for removing excess high frequency image components with fixed threshold range to detect an edge and to compare the edge density of background window 44 with respect to the detected pedestrian window 46. The fixed threshold range and the detector may be selected based upon factors such as the dimensions of the detected pedestrian window 46 or the background window 44, the resolution of the video image, processing capabilities of the processor 16, and the like. For example when detecting the edge density of the detected pedestrian window of a video image taken by the DOD GS600 Digital Video Recorder, the lower threshold may be set to 0.11 and the upper threshold may be set to 0.27. To replicate the low pass characteristic of human vision, a 7×7 Gaussian filter is respectively applied to the detected pedestrian window 46 or the background window 44 processed by a Canny detector so as to remove excess high frequency image components to which human vision is not sensitive. Likewise, the edge density of the detected pedestrian window 46 may be calculated by applying a Canny detector with fixed threshold range to detect an edge and to compare the edge density of detected pedestrian window 46. Again, detecting the edge density of the detected pedestrian window of video image taken by the DOD GS600 Digital Video Recorder, the lower threshold may be set to 0.11 and the upper threshold may be set to 0.27. To replicate the low pass characteristic of human vision, a 7×7 Gaussian filter is applied to the detected pedestrian window 46 processed by the Canny detector so as to remove excess high frequency image components to which human vision is not sensitive.

The LPCAU 22 is configured to calculate an edge distribution of the background window 44 and the detected pedestrian by determining the histogram of edge magnitude binned by the edge orientation for both (1) the detected pedestrian window 46 and (2) the Isolated Background Window, wherein the Isolated Background Window is the background window 44 minus the detected pedestrian window 46. The edge distribution is a feature which may be used to calculate the local pedestrian clutter score 26. The edge distribution is also useful to help verify that the detected pedestrian is in fact a pedestrian.

The LPCAU 22 may be configured to calculate the local luminance variation within the pedestrian mask 32 and also within a region defined by the subtraction of the pedestrian mask 32 from the background window 44 (the "Maskless Background Window"). The LPCAU 22 utilizes a sliding window 34 and a mask luminance variation matrix 36. The mask luminance variation matrix 36 is dimensioned the same size as that of the pedestrian mask 32 so as to calculate the luminance variation of the pedestrian mask 32. When calculating the luminance variation of the pedestrian mask 32, a sliding window 34 is slid across the pedestrian mask 32 so as to calculate a standard deviation of luminance value within the sliding window 34 with respect to the same space of the mask luminance variation matrix 36. The standard deviation for a particular area of the pedestrian mask 32 is entered into the corresponding position of the luminance variation matrix 36. The luminance variation of the pedestrian mask 32 is calculated as the mean value of the populated mask luminance variation matrix 36.

Likewise, a sliding window 34 and a Maskless Background Window Luminance (the "MBWL") variation matrix 36 is provided. The MBWL variation matrix 36 is dimensioned the same size as the Maskless Background Window so as to calculate the luminance variation of the Maskless Background Window. When calculating the luminance variation of the pedestrian mask 32, sliding window 34 is slid across the Maskless Background Window so as to calculate a standard deviation of luminance value within the sliding window 34 with respect to the same space of the MBWL variation matrix 36. The standard deviation for a particular area of the Maskless Background Window is entered into the corresponding position of the MBWL variation matrix 36. The luminance variation of the Maskless Background Window is calculated as the mean value of the populated MBWL variation matrix 36.

The LPCAU 22 may be further configured to calculate the local chrominance variation within the pedestrian mask 32 and also within Maskless Background Window. As with computing global chrominance, the computation of local chrominance variation is calculated using two chrominance channels, "a" and "b" for both the pedestrian mask 32 and the Maskless Background Window. The chrominance variation is calculated by determining the standard deviation for each respective channel. The local chrominance variation may be calculated as follows:

$$\sigma_c = \sqrt{\sigma_a^2 + \sigma_b^2},$$

where $\sigma_c$ is the global chrominance variation, $\sigma_a$ is the chrominance variation of channel "a," and $\sigma_b$ is the chrominance variation of channel "b."

The LPCAU 22 may be further configured to calculate the mean luminance intensity within the cloth mask 42 and a region generated by subtracting the cloth mask 42 from the background window 44 (the "Cloth Maskless Background Region"). The LPCAU 22 may also calculate the mean chrominance intensity within the cloth mask 42 and Cloth Maskless Background Region. The LPCAU 22 may calculate the local pedestrian clutter using features described above, that is the: (1) calculated edge density and edge distribution; (2) the local luminance variation of the pedestrian mask 32 and the Maskless Background Window; (3) the local chrominance variation within the pedestrian mask 32 and also within Maskless Background Window; (4) the mean luminance intensity within the cloth mask 42 and also of the Cloth Maskless Background Region, and (5) the mean chrominance intensity of the cloth mask 42 and the Cloth Maskless Background Region. For instance, the local pedestrian clutter (the "LPC") score may be calculated by computing the above referenced figures in the following formulation:

$$LPC = 1 - \frac{\text{dist}(T, B)}{\|\text{dist}(T, B)\|},$$

where T is a dimensional feature vector of the pedestrian area and B is a corresponding dimensional feature vector of the background area, wherein the features are the calculated edge distribution, the local luminance variation of the pedestrian mask 32 and the Maskless Background Window, the local chrominance variation within the pedestrian mask 32 and also within Maskless Background Window, the mean luminance intensity within the cloth mask 42 and also of the Cloth Maskless Background Region, and the mean chrominance intensity of the cloth mask 42 and the Cloth Maskless Background Region. dist measures the distance between the two vectors, which may be measured using Euclidean distance. The local pedestrian clutter score 26 is normalized to a value between 0 to 1, wherein the higher the local pedestrian clutter score 26, the more cluttered the pedestrian is, and thus the more difficult it is for a driver to perceive the pedestrian from the environment.

With reference now to FIG. 7, a chart and accompanying view of the driving environment is provided. The chart includes both the global clutter score 24 and the local pedestrian clutter score 26, each of which were computed in accordance with the details provided herein. Image 4 and 5 are of the same environment with a global clutter score 24 of 0.307. The global clutter score 24 provides reasonable reference to the global clutter level although they are not very discriminative while comparing some similar driving scenes. However, the local pedestrian clutter score 26 reflects the difficulty of pedestrian perception is more compared to the global clutter score 24. The images indicate that (1) low contrast image tends to have lower global clutter score 24, such as night image (Image 1 with global clutter score 24 of 0.116) and image with excessive glares and reflections (Image 2 with a global clutter score 24 of 0.220); (2) color saliency is the most important factor that may affect the local pedestrian clutter score 26, e.g., Image 6 has the lowest local pedestrian clutter score 26 (0.527) due to its highly saturated and discriminative pants color compared to the neighborhood area; and (3) local pedestrian clutter could be a better indicator and reference for pedestrian perception difficulty in naturalistic driving scenarios. For example, even though Image 1 has the lowest global clutter score 24 (0.116), it is the most difficult to detect the pedestrian in dark clothing relative to the other images, because of its high local pedestrian clutter score 26 (0.928).

The pedestrian perception alert system 10 processes both the global clutter score 24 and the local pedestrian clutter score 26 so as to calculate a pedestrian detection score 28. The pedestrian detection score 28 may be calculated by simply determining the difference between the two scores, wherein the alert 14 is actuated when the pedestrian detection score 28 is outside of a predetermined threshold, or above a desired value. In another embodiment the global clutter score 24 or the local pedestrian clutter score 26 is weighted based upon the environment such that one of the scores factors more heavily in calculation of the pedestrian detection score 28.

As stated above, the pedestrian perception alert system 10 includes a PDU 18. The PDU 18 is configured to process two dimensional video to detect a pedestrian. In one embodiment, the PDU 18 is configured to execute a first detection method 48 or a second detection method 50 based upon the probability of a pedestrian appearance within the video image. The first detection method 48 is executed in instances where there is a low chance of pedestrian appearance and the second detection method 50 is executed in instances where there is a high chance of pedestrian appearance.

The PDU 18 may determine a probability of a pedestrian appearance based upon the time of day, geographic location, or traffic scene. Alternatively, the PDU 18 may process a look-up table having pre-calculated or observed statistics regarding the probability of a pedestrian based upon time, geographic location, or traffic scene. For illustrative purposes, the look-up table may indicate that there is a five (5) percent probability of a pedestrian at 3:22 a.m., on December 25$^{th}$, in Beaverton, Oreg., on a dirt road. Accordingly, as the probability of a pedestrian appearance in the driving scene is relatively low, the PDU 18 executes the first detection method 48.

The first detection method 48 is configured to identify a region of interest within the video image by determining the variation between sequential frames of the video image. The PDU 18 identifies a region of interest in instances where the variation between sequential frames exceeds a predetermined threshold. The first detection method 48 further applies a set of constraints, such as pedestrian size, shape, orientation, height-width ratio and the like, to each of the regions of interest, wherein each region of interest having a requisite number of constraints is labeled as having a pedestrian.

The second detection method 50 is configured to determine regions of interests within the video image by detecting vertical edges within the frame. The PDU 18 identifies a region of interests in instances where the vertical edge has a predetermined characteristic. The second detection method 50 further applies a feature filter, illustratively including, but not limited to, a Histogram of Oriented Gradient detector to each region of interest, wherein each region of interest having a requisite number of features is labeled as having a pedestrian.

Figure 8:
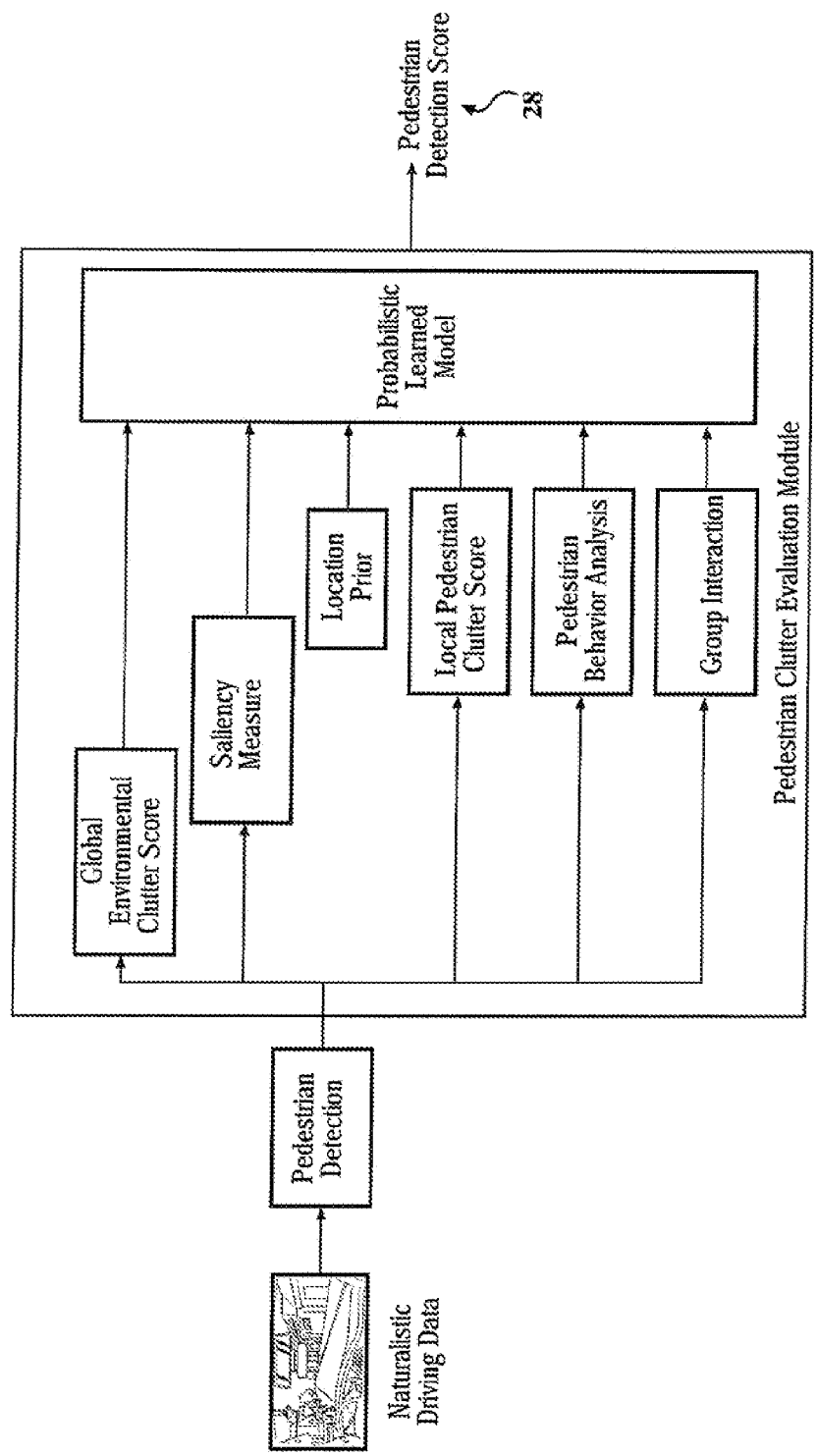
FIG. 8 is a diagram of a system showing the input of the SMGU, and PGAU to generate a pedestrian detection score.

With reference now to FIG. 8, the pedestrian perception alert system 10 may include additional units configured to calculate a pedestrian detection score 28. As shown, the pedestrian detection score 28 may be computed using the global clutter score 24, saliency measure, location prior, local pedestrian clutter score 26, pedestrian behavior analysis, and group interaction. The Factors may be processed together by the processor 16 to generate a Probabilistic Learned Model (the "PLM") which may be further processed so as to generate a pedestrian detection score 28. The PLM stores the Factors over time and calculates the pedestrian detection score 28 based in part upon the learned influence one Factor may have upon the other Factor. Thus, the PLM is helpful in refining and providing an accurate pedestrian detection score through learned experiences.

Figure 9:
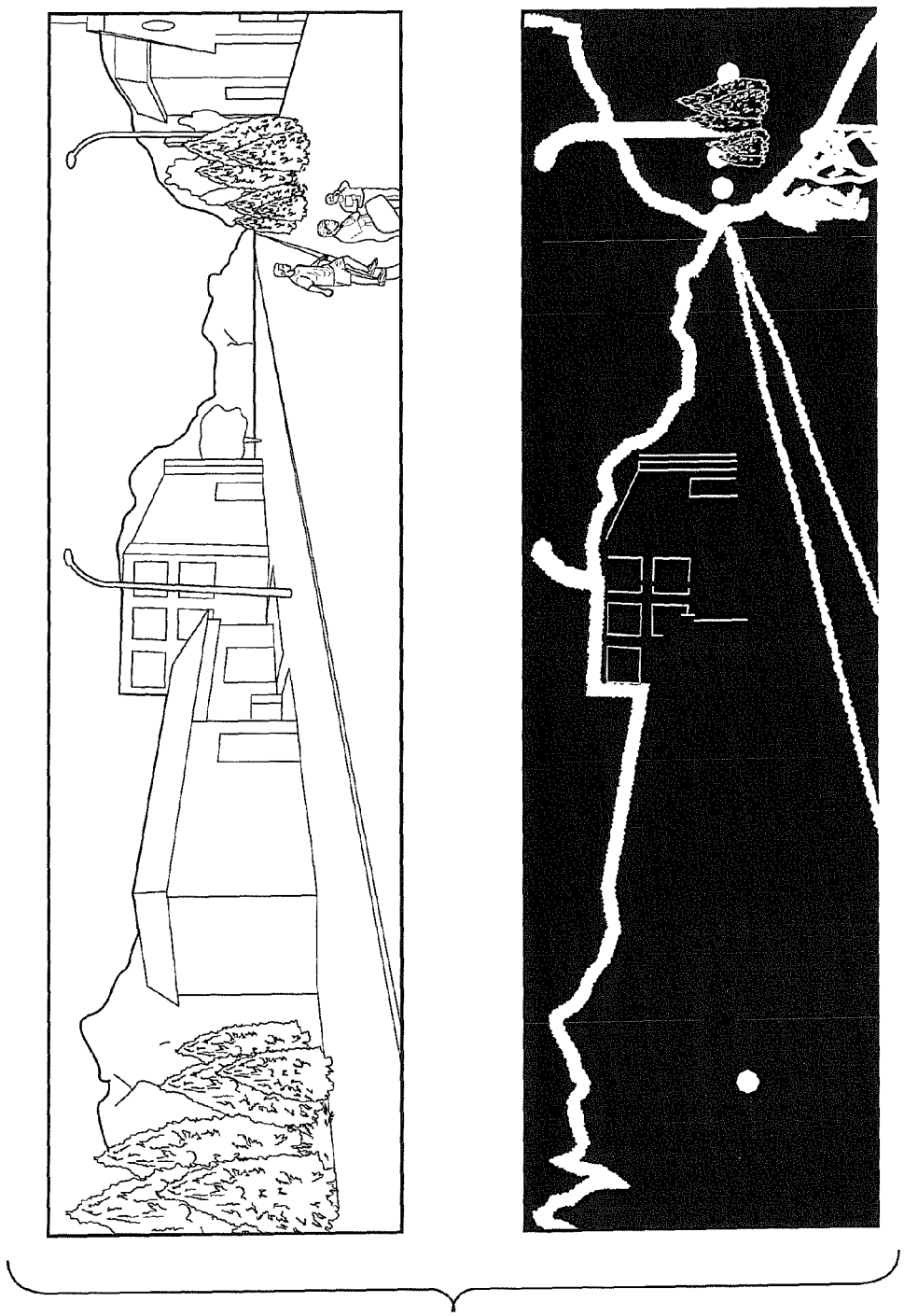
FIG. 9 is an example of a saliency map.

The pedestrian perception alert system 10 may further include a Saliency Map Generating Unit ("SMGU") 52. The SMGU 52 is configured to process the video image and extract salient features from the video image. The SMGU 52 is directed to replicating the human vision system wherein between the pre-attention stage and the recognition state task and target functions of the human vision system are completed. The SMGU 52 computes and generates a task and target independent bottom up saliency map using saliency computation approaches currently known and used in the art, illustratively including the saliency map shown in FIG. 9. The map shows strong connected edges of the image above. Specifically, the region with high salient features has high intensity. The processor 16 processes the extracted salient features and provides the salient features to the LPCAU 22 so as to generate a local pedestrian clutter score 26. The salient features may include, but are not limited to: (1) edges of the image; and (2) connecting edges of the image.

The pedestrian perception alert system 10 may be further configured to process pedestrian behavior to calculate the pedestrian detection score 28. Pedestrian behavior may include how the pedestrian motion affects the perception difficulty of the driver, and may be further used to verify pedestrian detection. Pedestrian behavior may also be examined in the context of the environment. Wherein pedestrian behavior includes analyzing the location and status of the appearing pedestrians, including standing, walking, running, carrying objects, etc., the perceived pedestrian clutter determined/calculated by the environment surrounding the pedestrian. For instance, the SMGU 52 may be programmed with the behavior of a pedestrian at an urban cross walk, or on a side walk adjacent a residential street.

The pedestrian perception alert system 10 may further include a Pedestrian Group Analysis Unit ("PGAU") 54 configured to detect a group of pedestrians and assign a perception difficulty value to the group of pedestrians. The PGAU 54 analyzes individual pedestrian interaction within the group of pedestrians, and the interaction of one group of pedestrians with respect to another group of pedestrians. For the within group interaction case, pedestrians located close within the scene with similar behavior pattern, e.g. standing/crossing/walking in the same direction, may grouped by the viewer so that the clutter score of an individual pedestrian within the group will be limited to describe the pedestrian perception difficulty. Accordingly, a high cluttered pedestrian would be much easier to detect if he/she were grouped by the viewer into a group with much more salient pedestrians. The PGAU 54 utilizes group pedestrians' characteristics combined with individual pedestrian clutter features in judgment of visual clutter.

With respect to the analysis of the between group interactions, the PGAU 54 accounts for the fact that the perception of a pedestrian may also be affected by other pedestrians or distracting events/objects existing in the same scene. For example, a moving pedestrian may distract driver's attention more easily relative to a static pedestrian, and a dashing vehicle or bicycle may catch the attention of driver immediately. The PGAU 54 may utilize learned behavior of pedestrians in group interactions to calculate the pedestrian detection score 28.

Figure 10:
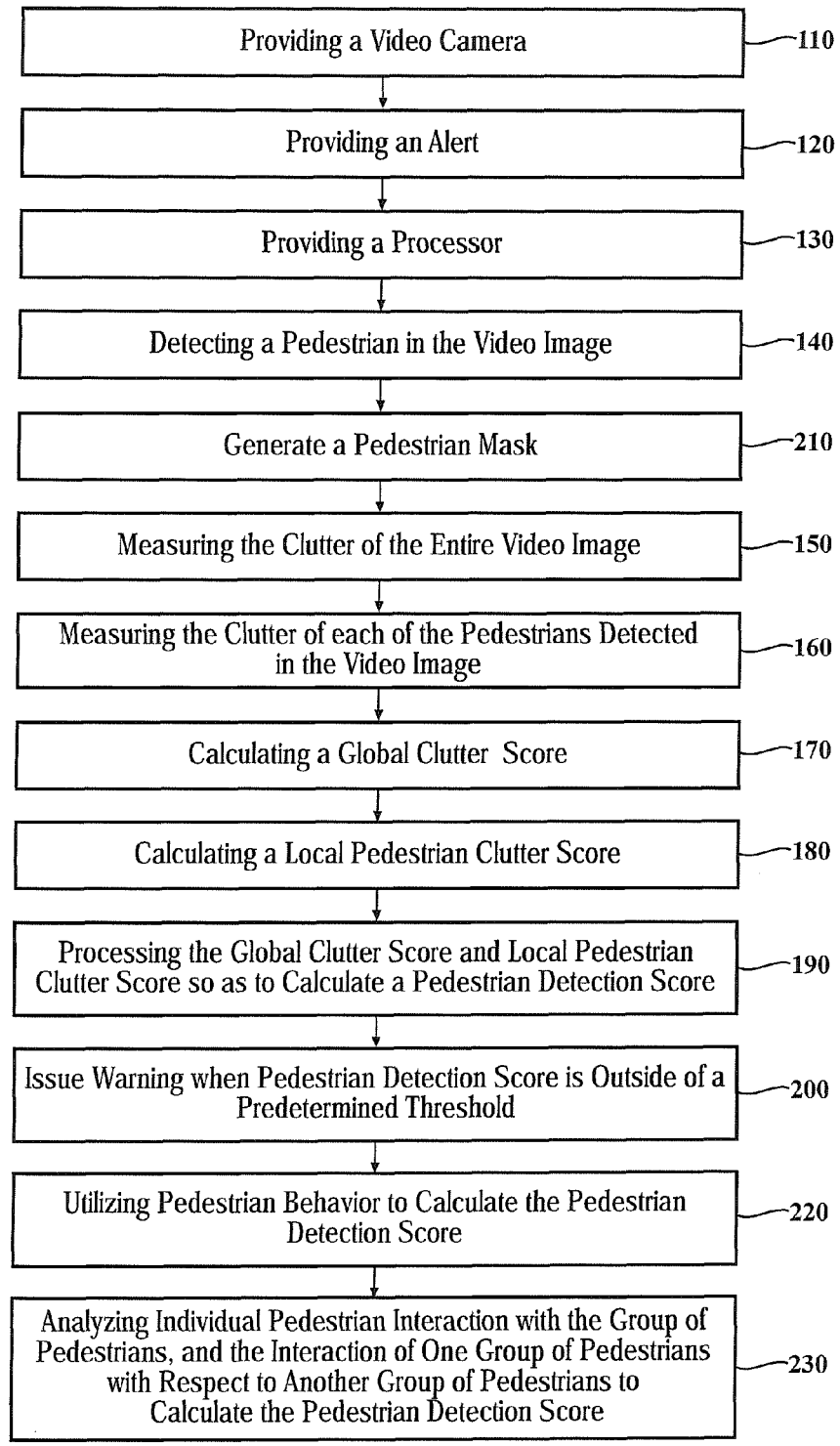
FIG. 10 is a diagram showing the steps of a method for issuing real-time warning when a driver's visual detection of a pedestrian is difficult.

With reference now to FIG. 10, a method for issuing alert 14 in real-time when a driver's visual detection of a pedestrian is difficult is also provided. The method includes the steps of providing a video camera 12, an alert 14 and a processor 16. These steps are referenced in FIGS. 8 as 110, 120, and 130 respectively. The video camera 12 is configured to capture video image. The alert 14 is configured to issue a warning that the pedestrian within the driving environment is difficult to visually perceive. The processor 16 is in electrical communication with the camera and processes the video image.

The method further includes detecting a pedestrian in the video image 140, measuring the clutter of the entire video image 150, measuring the clutter of each of the pedestrians detected in the video image 160, calculating a global clutter score 170, calculating a local pedestrian clutter score 180. The method 100 proceeds to step 190 wherein the global clutter score and local pedestrian clutter score are processed so as to calculate a pedestrian detection score, and in step 200 the method issues a warning when the pedestrian detection score is outside of a predetermined threshold so as to notify the driver that visual perception of a pedestrian is difficult.

The method 100 may utilize the PDU 18, GCAU 20, and LPCAU 22 as described herein so as to detect a pedestrian, measure global clutter and pedestrian clutter, and calculate a global clutter score and a local pedestrian clutter score. The PDU 18 analyzes the video camera 12 image to detect a pedestrian. The GCAU 20 generates the global clutter score 24 which measures the clutter of the entire video image. The LPCAU 22 generates the local pedestrian clutter score 26 which measures the clutter of each of the pedestrians detected in the video image.

Both the GCAU 20 and the LPCAU 22 are initiated when the PDU 18 detects a pedestrian in the video image. The GCAU 20 and the LPCAU 22 may calculate a respective global clutter score 24 and local pedestrian clutter score 26 as described herein. The method proceeds to the step of processing the global clutter score 24 and local pedestrian clutter score 26 so as to generate a pedestrian detection score 28, and actuating the alert 14 when a pedestrian detection score 28 is outside of a predetermined threshold.

The method may further include step 210, a generating a pedestrian mask 32. The PCGU 30 may be configured to generate the pedestrian mask 32. The pedestrian mask 32 is a constructed image of the pedestrian based upon features commonly associated with a pedestrian. The pedestrian mask 32 includes the contour of the pedestrian which are applied to the detected pedestrian so as to verify that the detected pedestrian is indeed an actual pedestrian. It should be appreciated that these features may vary based upon the location of the pedestrian within the driving environment, and/or the time at which the PCGU 30 is actuated, may be used to generate the pedestrian mask 32, and to refine the pedestrian mask 32 through subsequent video frames so as to ensure accuracy of the verification process. Thus, by continuously refining the pedestrian mask 32, the pedestrian mask 32 is a deformable model 40 which is applied around the pedestrian contour 38. Energy minimization may be used to evolve the contour 38. The energy function may be expressed as follows:

$$E(C) = \alpha \int_0^1 |C'(s)|^2 ds + \beta \int_0^1 |C''(s)|^2 ds - \gamma \int_0^1 |\nabla u_0(C(s))|^2 ds,$$

where the first two integrals stand for the internal energy which control the contour 38 smoothness and the third integral is the external energy which evolves the contour 38 to the object. C'(s) is the tangent of the curve and C''(s) is normal to the curve. The edge detector function may be defined as:

$$g(\nabla u_0(x, y)) = \frac{1}{1 + |\nabla G_\sigma(x, y) * u_0(x, y)|^p},$$

where $G_\sigma$ is a Gaussian smooth filter and $\nabla u_0$ is the image gradient. The generated contour 38 defines the pedestrian mask 32 which may be used by the LPCAU 22 to compute pedestrian clutter features, to include local pedestrian luminance variation and local pedestrian chrominance variation.

The method may include utilizing edge density, luminance variation and chrominance variation of the video image to calculate the global clutter score 24 and edge density of the detected pedestrian, edge distribution, local luminance variation, local chrominance variation, mean luminance intensity, and mean chrominance intensity to calculate the local pedestrian clutter score 26. The pedestrian detection score 28 is the difference between the global clutter score 24 and local pedestrian score.

Edge density may be calculated by removing high frequency image components and subsequently determining a ratio between the number of edge pixels and the total number of pixels within the video frame. The method may utilize a sliding window 34 and a luminance variation matrix 36 dimensioned the same size as the video frame, to calculate the luminance variation, wherein the GCAU 20 is configured to slide the sliding window 34 across the entire video frame so as to calculate a standard deviation of luminance value within the sliding window 34. The luminance variance may be calculated by entering the standard deviation for a particular area of the video frame into the corresponding position of the luminance variation matrix 36, and calculating the mean value of the luminance matrix. The chrominance variation may be calculated using two chrominance channels as described above.

The global clutter score 24 may be outputted as a weighted sum of the edge density, luminance variation, and chrominance variation. The edge density, luminance variation, and chrominance variation may be evenly weighted, with each selected at ⅓ weighted value. The resultant global environmental clutter score may be scaled and normalized to a value between 0 and 1 such that the higher score means higher clutter.

LPCAU 22 may be further configured to generate a background window 44 and a detected pedestrian window 46. The background window 44 is a portion of the video image having a predetermined dimension of the environment surrounding the detected pedestrian. The detected pedestrian window 46 is a portion of the video frame dimensioned to capture the image of the detected pedestrian. For example the background window 44 may be at least twice the area of the detected pedestrian window 46. The LPCAU 22 is further configured to determine the ratio between the number of edge pixels and the total number of pixels within both (1) the detected pedestrian window 46 and (2) the background window 44 and absent the detected pedestrian window 46, so as to calculate an edge density for a pedestrian.

The LPCAU 22 is configured to calculate an edge distribution of the background window 44 and the detected pedestrian by determining the histogram of edge magnitude binned by the edge orientation for both (1) the detected pedestrian window 46 and (2) the Isolated Background Window, as defined herein. The edge distribution is a feature which may be used to calculate the local pedestrian clutter score 26. The edge distribution is also useful to help verify that the detected pedestrian is in fact a pedestrian.

The LPCAU 22 may be configured to calculate the local luminance variation within the pedestrian mask 32 and also within a region defined by the subtraction of the pedestrian mask 32 from the background window 44 (the "Maskless Background Window"). The LPCAU 22 utilizes a sliding window 34 and a mask luminance variation matrix 36. The mask luminance variation matrix 36 is dimensioned the same size as that of the pedestrian mask 32 so as to calculate the luminance variation of the pedestrian mask 32. When calculating the luminance variation of the pedestrian mask 32, a sliding window 34 is slid across the pedestrian mask 32 so as to calculate a standard deviation of luminance value within the sliding window 34 with respect to the same space of the mask luminance variation matrix 36. The standard deviation for a particular area of the pedestrian mask 32 is entered into the corresponding position of the luminance variation matrix 36. The luminance variation of the pedestrian mask 32 is calculated as the mean value of the populated mask luminance variation matrix 36.

Likewise, a sliding window 34 and a MBWL variation matrix 36 is provided. The MBWL variation matrix 36 is dimensioned the same size as the Maskless Background Window so as to calculate the luminance variation of the Maskless Background Window. When calculating the luminance variation of the pedestrian mask 32, sliding window 34 is slid across the Maskless Background Window so as to calculate a standard deviation of luminance value within the sliding window 34 with respect to the same space of the MBWL variation matrix 36. The standard deviation for a particular area of the Maskless Background Window is entered into the corresponding position of the MBWL variation matrix 36. The luminance variation of the Maskless Background Window is calculated as the mean value of the populated MBWL variation matrix 36.

The LPCAU 22 may be further configured to calculate the local chrominance variation within the pedestrian mask 32 and also within Maskless Background Window. As with computing global chrominance, the computation of local chrominance variation is calculated using two chrominance channels, "a" and "b" for both the pedestrian mask 32 and the Maskless Background Window. The chrominance variation is calculated by determining the standard deviation for each respective channel. The global chrominance variation may be calculated as follows:

$$\sigma_c = \sqrt{\sigma_a^2 + \sigma_b^2},$$

where $\sigma_c$ is the global chrominance variation, $\sigma_a$ is the chrominance variation of channel "a," and $\sigma_b$ is the chrominance variation of channel "b."

The LPCAU 22 may be further configured to calculate the mean luminance intensity within the cloth mask 42 and a region generated by subtracting the cloth mask 42 from the background window 44 (the "Cloth Maskless Background Region"). The LPCAU 22 may also calculate the mean chrominance intensity within the cloth mask 42 and Cloth Maskless Background Region. The LPCAU 22 may calculate the local pedestrian clutter using features described above, that is the: (1) calculated edge distribution; (2) the local luminance variation of the pedestrian mask 32 and the Maskless Background Window; (3) the local chrominance variation within the pedestrian mask 32 and also within Maskless Background Window; (4) the mean luminance intensity within the cloth mask 42 and also of the Cloth Maskless Background Region, and (5) the mean chrominance intensity of the cloth mask 42 and the Cloth Maskless Background Region. For instance, the local pedestrian clutter (LPC) score may be calculated by computing the above referenced figures in the following formulation:

$$LPC = 1 - \frac{\text{dist}(T, B)}{\|\text{dist}(T, B)\|},$$

where T is a dimensional feature vector of the pedestrian area and B is a corresponding dimensional feature vector of the background area. dist measures the distance between the two vectors, which may be measured using Euclidean distance. The local pedestrian clutter score 26 is normalized to a value between 0 to 1, wherein the higher the local pedestrian clutter score 26, the more cluttered the pedestrian is, and thus the more difficult it is for a human to perceive the pedestrian from the environment.

As stated above, the method includes the step of providing a PDU 18 to detect a pedestrian. In one embodiment, the PDU 18 is configured to execute a first detection method 48 or a second detection method 50 based upon the probability of a pedestrian appearance within the video image. The first detection method 48 is executed in instances where there is a low chance of pedestrian appearance and the second detection method 50 is executed in instances where there is a high chance of pedestrian appearance.

The PDU 18 may determine a probability of a pedestrian appearance based upon the time of day, geographic location, or traffic scene. Alternatively, the PDU 18 may process a look-up table having pre-calculated or observed statistics regarding the probability of a pedestrian based upon time, geographic location, or traffic scene. For illustrative purposes, the look-up table may indicate that there is a five (5) percent probability of a pedestrian at 0322 AM, during December $25^{th}$, in Beaverton Oreg., on a dirt road. Accordingly, as the probability of a pedestrian appearance in the driving scene is relatively low, the PDU 18 executes the first detection method 48.

The first detection method 48 is configured to identify regions of interests within the video image by determining the variation between sequential frames of the video image. The PDU 18 identifies a region of interests in instances where the variation between sequential frames exceeds a predetermined threshold. The first detection method 48 further applies a set of constraints, such as pedestrian size, shape, orientation, height-width ratio and the like to each of the regions of interest, wherein each region of interest having a requisite number of constraints is labeled as having a pedestrian.

The second detection method 50 is configured to determine regions of interests within the video image by detecting vertical edges within the frame. The PDU 18 identifies a region of interests in instances where the vertical edge has a predetermined characteristic. The second detection method 50 further applies a feature filter, illustratively including, but not limited to, a Histogram of Oriented Gradient detector, to each region of interest, wherein each region of interest having a requisite number of features is labeled as having a pedestrian.

The method may include the processing of additional features to calculate a pedestrian detection score 28. As shown, the pedestrian detection score 28 may be computed using the global clutter score 24, saliency measure, location prior, local pedestrian clutter score 26, pedestrian behavior analysis, and group interaction, (each referenced hereafter as a "Factor" and collectively as the "Factors"). The Factors may be processed together by the processor 16 to generate a Probabilistic Learned Model (the "PLM") which may be further processed so as to generate a pedestrian detection score 28. The PLM stores the Factors over time and calculates the pedestrian detection score 28 based in part upon the learned influence one Factor may have upon the other Factor. Thus, the PLM is helpful in refining and providing an accurate pedestrian detection score through learned experiences.

The method may further include the step of providing a Saliency Map Generating Unit ("SMGU 52"). The SMGU 52 is configured to process the video image and extract salient features from the video image. The SMGU 52 is directed to replicating the human vision system wherein between the pre-attention stage and the recognition state task and target functions of the human vision system are completed. The SMGU 52 computes and generates a task and target independent bottom up saliency map using saliency computation approaches currently known and used in the art, illustratively including the saliency map shown in FIG. 9. The map shows strong connected edges of the image above. Specifically, the region with high salient features has high intensity. The processor 16 processes the extracted salient features and provides the salient features to the LPCAU 22 so as to generate a local pedestrian clutter score 26. The salient features may include, but are not limited to: (1) edges of the image; and (2) connecting edges of the image.

The method may further include step 220, processing pedestrian behavior to calculate the pedestrian detection score 28. Pedestrian behavior may include how the pedestrian motion affects the perception difficulty of the driver, and may be further used to verify pedestrian detection. Pedestrian behavior may also be examined in the context of the environment. Wherein pedestrian behavior includes analyzing the location and status of the appearing pedestrians, including standing, walking, running, carrying objects, etc., the perceived pedestrian clutter determined/calculated by the environment surrounding the pedestrian. For instance, the SMGU 52 may be programmed with the behavior of a pedestrian at an urban cross walk, or on a side walk adjacent a residential street.

The method may further include step 230, analyzing individual pedestrian interaction within the group of pedestrians, and the interaction of one group of pedestrians with respect to another group of pedestrians to calculate the pedestrian detection score. A Pedestrian Group Analysis Unit ("PGAU 54") is configured to detect a group of pedestrians and assign a perception difficulty value to the group of pedestrians. The PGAU 54 analyzes individual pedestrian interaction within the group of pedestrians, and the interaction of one group of pedestrians with respect to another group of pedestrians. For the within group interaction case, pedestrians located close within the scene with similar behavior pattern, e.g., standing/crossing/walking in the same direction, may grouped by the viewer so that the clutter score of an individual pedestrian within the group will be limited to describe the pedestrian perception difficulty. Accordingly, a high cluttered pedestrian would be much easier to detect if he/she grouped by the viewer into a group with much more salient pedestrians. The PGAU 54 utilizes group pedestrians' characteristics combined with individual pedestrian clutter features in judgment of visual clutter.

With respect to the analysis of the between group interactions, the PGAU 54 accounts for the fact that the perception of a pedestrian may also be affected by other pedestrians or distracting events/objects existing in the same scene. For example, a moving pedestrian may distract driver's attention more easily relative to a static pedestrian, and a dashing vehicle or bicycle may catch the attention of driver immediately. The PGAU 54 may utilize learned behavior of pedestrians in group interactions to calculate the pedestrian detection score 28.

Obviously, many modifications and variations of the present invention are possible in light of the above teachings and may be practiced otherwise than as specifically described while within the scope of the appended claims.

The invention claimed is:

1. A pedestrian perception alert system configured to issue a warning in real-time when driver visual perception of a pedestrian is difficult, the pedestrian perception alert system comprising:
   a video camera configured to capture video image;
   an alert for issuing the warning;
   a processor in electrical communication with the video camera;

a Pedestrian Detection Unit ("PDU") configured to analyze the video image to detect the pedestrian;

a Global Clutter Analysis Unit ("GCAU") configured to generate a global clutter score, the global clutter score measuring the clutter of the entire video image; and a Local Pedestrian Clutter Analysis Unit ("LPCAU") configured to generate a local pedestrian clutter score, the local pedestrian clutter score measuring the clutter of each of the pedestrians detected in the video image, wherein when the PDU detects a pedestrian in the video image the processor initiates both the GCAU and the LPCAU, the processer processes the global clutter score and local pedestrian clutter score so as to generate a pedestrian detection score, and processor further actuating the alert when the pedestrian detection score is outside of a predetermined threshold so as to warn a driver that it is difficult to visually perceive a pedestrian.

2. The pedestrian perception alert system as set forth in claim 1, further including a Pedestrian Contour Generation Unit ("PCGU") configured to generate a pedestrian mask, the LCPAU further processing the pedestrian mask so as to compute the local pedestrian clutter score.

3. The pedestrian perception alert system as set forth in claim 2, wherein the GCAU processes edge density, luminance variation and chrominance variation of the video image to calculate the global clutter score and the LPCAU processes edge density of the detected pedestrian, edge distribution, local luminance variation, local chrominance variation, mean luminance intensity, and mean chrominance intensity to calculate the local pedestrian clutter score.

4. The pedestrian perception alert system as set forth in claim 3, wherein pedestrian detection score is the difference between the global clutter score and local pedestrian score.

5. The pedestrian perception alert system as set forth in claim 3, wherein the GCAU is further configured to remove high frequency image components and subsequently calculating a ratio between a number of edge pixels and a total number of pixels within a video frame so as to calculate the edge density.

6. The pedestrian perception alert system as set forth in claim 3, wherein the GCAU includes a sliding window and a luminance variation matrix dimensioned the same size as the video frame, the GCAU configured to slide the sliding window across the entire video frame so as to calculate a standard deviation of luminance value within the sliding window, the standard deviation for a particular area of the video frame is entered into a corresponding position of the luminance variation matrix, and wherein the luminance variation is calculated as the mean value of the luminance matrix.

7. The pedestrian perception alert system as set forth in claim 3, wherein the chrominance variation is calculated using two chrominance channels.

8. The pedestrian perception alert system as set forth in claim 3, wherein the edge density, luminance variation, and chrominance variation are evenly weighted when calculating the global clutter score.

9. The pedestrian perception alert system as set forth in claim 2, wherein the PCGU generates a contour of the detected pedestrian and generates a deformable model which is applied to the contour, wherein the PCGU applies energy minimization function to further refine the contour so as to generate the pedestrian mask.

10. The pedestrian perception alert system as set forth in claim 9, wherein PCGU is further configured to segment a cloth region from a background image of the video image so as to further generate a cloth mask.

11. The pedestrian perception alert system as set forth in claim 9, wherein the LPCAU is further configured to generate a background window and a detected pedestrian window, the background window being at least twice the area of the detected pedestrian window, and wherein the background window includes the video image surrounding the detected pedestrian.

12. The pedestrian perception alert system as set forth in claim 11, wherein the LPCAU is further configured to determine the ratio between the number of edge pixels and the total number of pixels within both (1) the detected pedestrian window and (2) the background window and absent the detected pedestrian window, so as to calculate an edge density for a pedestrian.

13. The pedestrian perception alert system as set forth in claim 12, wherein the LPCAU is configured to calculate the edge distribution of the background window and the detected pedestrian by determining the histogram of edge magnitude binned by the edge orientation for both (1) the detected pedestrian window and (2) the background window and absent the detected pedestrian window.

14. The pedestrian perception alert system as set forth in claim 11, wherein the LPCAU is configured to calculate the local luminance variation within the pedestrian mask and also within a region defined by the subtraction of the pedestrian mask from the background window.

15. The pedestrian perception alert system as set forth in claim 11, wherein the LPCAU calculates the local chrominance variation within the pedestrian mask and also within a region defined by the subtraction of the pedestrian mask from the background window.

16. The pedestrian perception alert system as set forth in claim 11, wherein the LPCAU calculates the mean luminance intensity within the cloth mask and a region generated by subtracting the cloth mask from the background window.

17. The pedestrian perception alert system as set forth in claim 11, wherein the LPCAU is configured to calculate the mean chrominance intensity within the cloth mask and a region generated by subtracting the cloth mask from the background window.

18. The pedestrian perception alert system as set forth in claim 1, wherein the PDU is configured to execute a first detection method or a second detection method based upon the probability of pedestrian appearance within the video image, wherein the first detection method is executed in instances where there is a low chance of pedestrian appearance and the second detection method is executed in instances where there is a high chance of pedestrian appearance.

19. The pedestrian perception alert system as set forth in claim 18, wherein the PDU determines a probability of a pedestrian appearance based upon at least one of the following criteria: time, geographic location, or traffic scene.

20. The pedestrian perception alert system as set forth in claim 19, wherein the first detection method is configured to identify a region of interest within the video image by determining the variation between sequential frames of the video image, and identifies a region of interest in instances where the variation exceeds a predetermined threshold, the first detection method further applying a set of constraints to each of the regions of interest, wherein each region of interest having a requisite number of constraints is labeled as having a pedestrian.

21. The pedestrian perception alert system as set forth in claim 20, wherein the second detection method is configured to determine the region of interest within the video image by detecting vertical edges within the frame, and identifies the region of interests in instances where the vertical edge has a predetermined characteristic, the second detection method further applying a feature filter to each region of interest, wherein each region of interest having a requisite number of features is labeled as having a pedestrian.

22. The pedestrian perception alert system as set forth in claim 1, further including a Saliency Map Generating Unit ("SMGU"), the SMGU is configured to process the video image and extract salient features from the video image, wherein the processor is further configured to actuate the LPCAU wherein the extracted salient features are processed so as to generate the local pedestrian clutter score.

23. The pedestrian perception alert system as set forth in claim 22, wherein the salient features include pedestrian behavior.

24. The pedestrian perception alert system as set forth in claim 23, wherein the pedestrian behavior is pedestrian motion.

25. The pedestrian perception alert system as set forth in claim 23, wherein the pedestrian behavior is based upon an environment surrounding the pedestrian.

26. The pedestrian perception alert system as set forth in claim 22, further including a Pedestrian Group Analysis Unit ("PGAU") configured to detect a group of pedestrians and assign a perception difficulty value to the group of pedestrians, wherein the PGAU analyzes individual pedestrian interaction within the group of pedestrians, and the interaction of one group of pedestrians with respect to another group of pedestrians.

27. A method for issuing an alert in real-time when a driver's visual detection of a pedestrian is difficult, the method comprising the steps of:
providing a video camera configured to capture video image;
providing an alert for issuing a warning that the pedestrian in a driving environment is visually difficult to perceive;
providing a processor in electrical communication with the camera;
analyzing the video image to detect a pedestrian;
measuring a clutter of an entire video image and calculating a global clutter score;
measuring the clutter of each pedestrian detected in the video image and calculating a local pedestrian clutter score;
processing the global clutter score and local pedestrian clutter score to calculate a pedestrian detection score; and
issuing a warning when the pedestrian detection score is outside of a predetermined threshold so as to notify the driver that visual perception of a pedestrian is difficult.

28. The method as set forth in claim 27, further including the step of providing a processor, Pedestrian Detection Unit ("PDU"), a Global Clutter Analysis Unit ("GCAU"), and a Local Pedestrian Clutter Analysis Unit ("LPCAU"), the PDU analyzes the video image to detect a pedestrian, the GCAU analyzes the video image to measure the clutter of the entire video image and calculate a global clutter score, and the LPCAU analyzes the detected pedestrians to measure the clutter of the detected pedestrians and calculate a local pedestrian clutter score, the processor processing the global clutter score and local pedestrian clutter score so as to calculate the pedestrian detection score.

29. The method as set forth in claim 28, further including the step of generating a pedestrian mask, the LPCAU processing the pedestrian mask to calculate the local pedestrian clutter score.

30. The method as set forth in claim 29, including a Pedestrian Contour Generation Unit ("PCGU") configured to generate the pedestrian mask.

31. The method as set forth in claim 30, wherein the GCAU processes edge density, luminance variation and chrominance variation of the video image to calculate the global clutter score and the LPCAU processes edge density of the detected pedestrian, edge distribution, local luminance variation, local chrominance variation, mean luminance intensity, and mean chrominance intensity to calculate the local pedestrian clutter score.

32. The method as set forth in claim 31, wherein pedestrian detection score is the difference between the global clutter score and local pedestrian score.

33. The method as set forth in claim 32, wherein the GCAU is further configured to remove high frequency image components and subsequently determine a ratio between a number of edge pixels and a total number of pixels within a video frame so as to calculate the edge density.

34. The method as set forth in claim 33, wherein the GCAU includes a sliding window and a luminance variation matrix dimensioned the same size as the video frame, the GCAU configured to slide the sliding window across the entire video frame so as to calculate a standard deviation of luminance value within the sliding window, the standard deviation for a particular area of the video frame is entered into the corresponding position of the luminance variation matrix, and wherein the luminance variation is calculated as the mean value of the luminance variation matrix.

35. The method as set forth in claim 31, wherein the chrominance variation is calculated using two chrominance channels.

36. The method as set forth in claim 31, wherein the edge density, luminance variation, and chrominance variation are evenly weighted when calculating the global clutter score.

37. The method as set forth in claim 30, wherein the PCGU generates a contour of the detected pedestrian and generates a deformable model which is applied to the contour, wherein the PCGU applies energy minimization function to further refine the contour so as to generate the pedestrian mask.

38. The method as set forth in claim 37, wherein PCGU is further configured to segment a cloth region from a background image of the video image so as to further generate a cloth mask.

39. The method as set forth in claim 38, wherein the LPCAU is further configured to generate a background window and a detected pedestrian window, the background window being at least twice the area of the detected pedestrian window, and wherein the background window includes the video image surrounding the detected pedestrian.

40. The method as set forth in claim 39, wherein the LPCAU is further configured to determine the ratio between the number of edge pixels and the total number of pixels within both (1) the detected pedestrian window and (2) the background window and absent the detected pedestrian window, so as to calculate an edge density for a pedestrian.

41. The method as set forth in claim 40, wherein the LPCAU is configured to calculate an edge distribution of the background window and the detected pedestrian by determining the histogram of edge magnitude binned by the edge orientation for both (1) the detected pedestrian window and (2) the background window and absent the detected pedestrian window.

42. The method as set forth in claim 39, wherein the LPCAU is configured to calculate the local luminance variation within the pedestrian mask and also within a region defined by the subtraction of the pedestrian mask from the background window.

43. The method as set forth in claim 39, wherein the LPCAU is configured to calculate the local chrominance variation within the pedestrian mask and also within a region defined by the subtraction of the pedestrian mask from the background window.

44. The method as set forth in claim 39, wherein the LPCAU is configured to calculate the mean luminance intensity within the cloth mask and a region generated by subtracting the cloth mask from the background window.

45. The method as set forth in claim 39, wherein the LPCAU is configured to calculate the mean chrominance intensity within the cloth mask and a region generated by subtracting the cloth mask from the background window.

46. The method as set forth in claim 27, wherein the PDU is configured to execute a first detection method or a second detection method based upon the probability of a pedestrian appearance within the video image, wherein the first detection method is executed in instances where there is a low chance of pedestrian appearance and the second detection method is execute in instances where there is a high chance of pedestrian appearance.

47. The method as set forth in claim 44, wherein the PDU determines a probability of a pedestrian appearance based upon at least one of time, geographic location, or traffic scene.

48. The method as set forth in claim 45, wherein the first detection method is configured to identify regions of interest within the video image by determining the variation between sequential frames of the video image, and identifies a region of interest in instances where the variation exceeds a predetermined threshold, the first detection method further applying a set of constraints to each of the regions of interest, wherein each region of interest having a requisite number of constraints is labeled as having a pedestrian.

49. The method as set forth in claim 46, wherein the second detection method is configured to determine regions of interest within the video image by detecting vertical edges within the frame, and identifies a region of interest in instances where the vertical edge has a predetermined characteristic, the second detection method further applying a feature filter to each region of interest, wherein each region of interest having a requisite number of features is labeled as having a pedestrian.

50. The method as set forth in claim 27, further including the step of utilizing pedestrian behavior to calculate the pedestrian detection score.

51. The method as set forth in claim 50, including a Saliency Map Generating Unit ("SMGU"), the SMGU is configured to process the video image and extract salient features from the video image, wherein the processor is further configured to process the extracted salient features with LPCAU so as to generate a local pedestrian clutter score, and wherein the salient features include pedestrian behavior.

52. The method as set forth in claim 51, wherein the pedestrian behavior is pedestrian motion.

53. The method as set forth in claim 51, wherein the pedestrian behavior is based upon an environment surrounding the pedestrian.

54. The method as set forth in claim 27, further including the step of analyzing individual pedestrian interaction within a group of pedestrians, and the interaction of one group of pedestrians with respect to another group of pedestrians to calculate the pedestrian detection score.

55. The method as set forth in claim 54, further including a Pedestrian Group Analysis Unit ("PGAU") configured to detect the group of pedestrians and assign a perception difficulty value to the group of pedestrians, the PGAU analyzes individual pedestrian interaction within the group of pedestrians, and the interaction of one group of pedestrians with respect to another group of pedestrians.

* * * * *